(12) United States Patent
Rodriguez et al.

(10) Patent No.: US 11,044,080 B2
(45) Date of Patent: Jun. 22, 2021

(54) CRYPTOGRAPHIC KEY ORCHESTRATION BETWEEN TRUSTED CONTAINERS IN A MULTI-NODE CLUSTER

(71) Applicant: International Business Machines Corporation, Armonk, NY (US)

(72) Inventors: Eduardo Rodriguez, Austin, TX (US); Pratheek Karnati, Raleigh, NC (US); Karunakar Bojjireddy, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 21 days.

(21) Appl. No.: 16/449,904

(22) Filed: Jun. 24, 2019

(65) Prior Publication Data

US 2020/0403784 A1 Dec. 24, 2020

(51) Int. Cl.
*H04L 9/08* (2006.01)
*G06F 21/62* (2013.01)

(52) U.S. Cl.
CPC ............ *H04L 9/0822* (2013.01); *G06F 21/62* (2013.01); *H04L 9/0894* (2013.01)

(58) Field of Classification Search
CPC ...... H04L 9/0822; H04L 9/0894; G06F 21/62
See application file for complete search history.

(56) References Cited

U.S. PATENT DOCUMENTS

| | | | |
|---|---|---|---|
| 7,421,741 B2 | 9/2008 | Phillips et al. | |
| 9,461,821 B1* | 10/2016 | Machani | H04L 9/085 |
| 10,225,240 B2* | 3/2019 | Detcheverry | H04L 63/061 |
| 2017/0185533 A1* | 6/2017 | Rozas | G06F 12/1466 |
| 2017/0201373 A1* | 7/2017 | Vijayakumar | G06F 21/6209 |
| 2017/0279797 A1* | 9/2017 | Cross, Jr. | G06F 9/45558 |
| 2018/0109378 A1* | 4/2018 | Fu | H04L 9/0852 |
| 2018/0167203 A1* | 6/2018 | Belenko | H04L 9/14 |
| 2018/0212770 A1* | 7/2018 | Costa | H04L 63/0428 |
| 2019/0026234 A1 | 1/2019 | Harnik et al. | |
| 2019/0042319 A1* | 2/2019 | Sood | G06F 9/5072 |
| 2019/0045037 A1* | 2/2019 | Sukhomlinov | H04L 67/40 |
| 2019/0058696 A1* | 2/2019 | Bowman | H04L 9/3236 |
| 2019/0180006 A1* | 6/2019 | Bojjireddy | G06F 21/53 |
| 2019/0220601 A1* | 7/2019 | Sood | G06F 21/85 |

OTHER PUBLICATIONS

PCT International Search Report and Written Opinion, dated Jul. 7, 2020, regarding Application No. PCT/EP2020/066133, 11 pages.
Bailey et al., "Trusted Virtual Containers on Demand," STC'10, Proceedings of the fifth ACM workshop on Scalable trusted computing, Oct. 4, 2010, Chicago, Illinois, pp. 63-72.

(Continued)

*Primary Examiner* — Yonas A Bayou
(74) *Attorney, Agent, or Firm* — Yee & Associates, P.C.

(57) ABSTRACT

Accessing shared sensitive information in a managed container environment is provided. Each worker node in a plurality of worker nodes has access to shared sensitive application data located in a secure enclave within the plurality of worker nodes using a data encryption key. Each worker node in the plurality of worker nodes protects the data encryption key of each respective worker node using a sealing key that is unique to the secure enclave on a respective worker node.

22 Claims, 8 Drawing Sheets

(56) References Cited

OTHER PUBLICATIONS

Zhai et al., "CQSTR: Securing Cross-Tenant Applications with Cloud Containers," SoCC '16, Proceedings of the Seventh ACM Symposium on Cloud Computing, Oct. 2016, Santa Clara, California, pp. 223-236.

Hosseinzaden et al., "Security in Container-based Virtualization through vTPM," 2016 IEEE/ACM 9th International Conference on Utility and Cloud Computing, UCC '16, Dec. 2016, Shanghai, China, pp. 214-219.

Arnautov et al., "SCONE: Secure Linux Containers with Intel SGX," 12th USENIX Symposium on Operating Systems Design and Implementation, Nov. 2016, Savannah, Georgia, pp. 689-703.

* cited by examiner

CRYPTOGRAPHIC KEY ORCHESTRATION BETWEEN TRUSTED CONTAINERS IN A MULTI-NODE CLUSTER

BACKGROUND

1. Field

The disclosure relates generally to open source container orchestration frameworks and more specifically to providing cryptographic key orchestration between trusted nodes and containers within a multi-node cluster of an open source container orchestration framework.

2. Description of the Related Art

An open source container orchestration framework, such as, for example, Kubernetes, is a cluster of interconnected physical and/or virtual computing nodes (i.e., machines), which provides automatic deployment, scaling, and management of containerized applications. An open source container orchestration framework orchestrates computing, networking, and storage infrastructure on behalf of application workloads. This provides much of the simplicity of Platform as a Service (PaaS) with the flexibility of Infrastructure as a Service (IaaS), and enables portability across infrastructure providers.

The cluster of nodes contains two types of nodes, a master node and a worker node. The master node is responsible for managing worker nodes in the cluster. The master node is the entry point for all operations to be executed in the cluster that are received from, for example, an application programming interface, a user interface, or a command line interface. The worker node is responsible for running one or more workloads and networking with different workloads running on other worker nodes in the cluster. Features of an open source container orchestration framework may include, for example, quick application deployment, auto-recovery and self-healing, and seamless application update.

The basic scheduling unit in a worker node is a container, such as, for example, a pod. Containers may be co-located on a worker node and share resources. Each container in the open source container orchestration framework is assigned a unique container internet protocol address within the cluster of worker nodes, which allows applications to use ports without the risk of conflict. Currently, containers can reference each other on the host machine, but a container located on one worker node has no way of directly addressing another container within another worker node, it will have to use the container's unique internet protocol address. A container can define a volume, such as, for example, a local disk directory or a network disk, and expose the volume to the other containers in the worker node. A service is a set of containers that work together, such as one tier of a multi-tier application.

However, in a cluster that contains a multitude of worker nodes, accessing sensitive data between applications running on the cluster is currently not possible. Especially true, when the sensitive application data are sealed by a secure enclave on a worker node. A secure enclave is an isolated and trusted area of memory where critical aspects of application functionality are protected, which helps keep sensitive application data confidential and unmodified. In other words, the secure enclave is an encrypted portion of main memory. The secure enclave is hardened by processor-based security mechanisms. While tagging security to a sealed cryptographic key derived from a given machine's hardware (e.g., the worker node's processor chip) is highly secure, this currently makes sharing sensitive application data in a dynamic, distributed open source container orchestration framework, such as Kubernetes, that much more challenging, if not impossible.

SUMMARY

According to one illustrative embodiment, a method for accessing shared sensitive information in a managed container environment is provided. Each worker node in a plurality of worker nodes has access to shared sensitive application data located in a secure enclave within the plurality of worker nodes using a data encryption key. Each worker node in the plurality of worker nodes protects the data encryption key of each respective worker node using a sealing key that is unique to the secure enclave on a respective worker node. Further, the method establishes a first worker node in a cluster. The first worker node generates the data encryption key and a first sealing key unique to the secure enclave on the first worker node for protecting the data encryption key. The first worker node performs remote attestation with a second worker node in the cluster in response to creation of the second worker node in the cluster. The first worker node provides a copy of the data encryption key to the second worker node upon successful performance of the remote attestation. Furthermore, the second worker node generates a second sealing key unique to the secure enclave on the second worker node for protecting the data encryption key by encrypting the data encryption key using the second sealing key. According to other illustrative embodiments, a system and computer program product for accessing shared sensitive information in a managed container environment are provided.

According to yet another illustrative embodiment, a computer-implemented method for cryptographic key orchestration is provided. A set of processors generates a worker node with a key orchestration agent in a cluster of an open source container orchestration framework. The set of processors, using the key orchestration agent of the worker node, generates a data encryption key. The set of processors, using the key orchestration agent, retrieves a sealing key of the first key orchestration agent from a secure enclave of the worker node. The set of processors, using the sealing key of the first key orchestration agent, seals the data encryption key. Further, the set of processors determines whether a container has been created in the worker node. In response to the set of processors determining that a container has been created in the worker node, the set of processors, using the first key orchestration agent, performs local attestation with the container to establish authenticity of the container. Then, the set of processors determines whether the container is trusted based on the local attestation. In response to the set of processors determining that the container is untrusted based on the local attestation, the set of processors denies access to the data encryption key by the container. In response to the set of processors determining that the container is trusted based on the local attestation, the set of processors, using the key orchestration agent, shares the data encryption key with the container, encrypts, using the data encryption key shared with the container, data corresponding to a workload of the container, and stores an identifier of the worker node and the data encryption key sealed with a unique sealing key of the container in a shared database. According to yet another illustrative embodiment, a computer program product for cryptographic key orchestration is provided.

As a result, illustrative embodiments are capable of providing cryptographic key orchestration between trusted containers within a cluster. Moreover, the illustrative embodiments enable different containers running a distributed application on different worker nodes within the cluster to share sensitive application data between the different containers by using the data encryption key that is sealed with a unique sealing key.

DETAILED DESCRIPTION

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
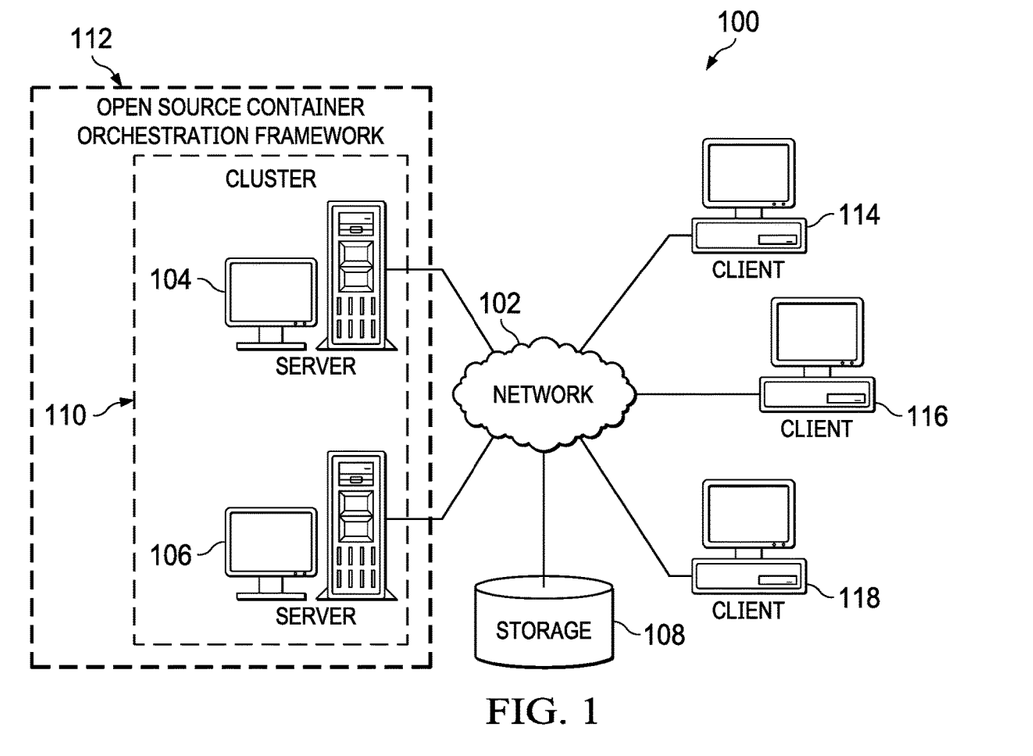
FIG. 1 is a pictorial representation of a network of data processing systems in which illustrative embodiments may be implemented.
Figure 2:
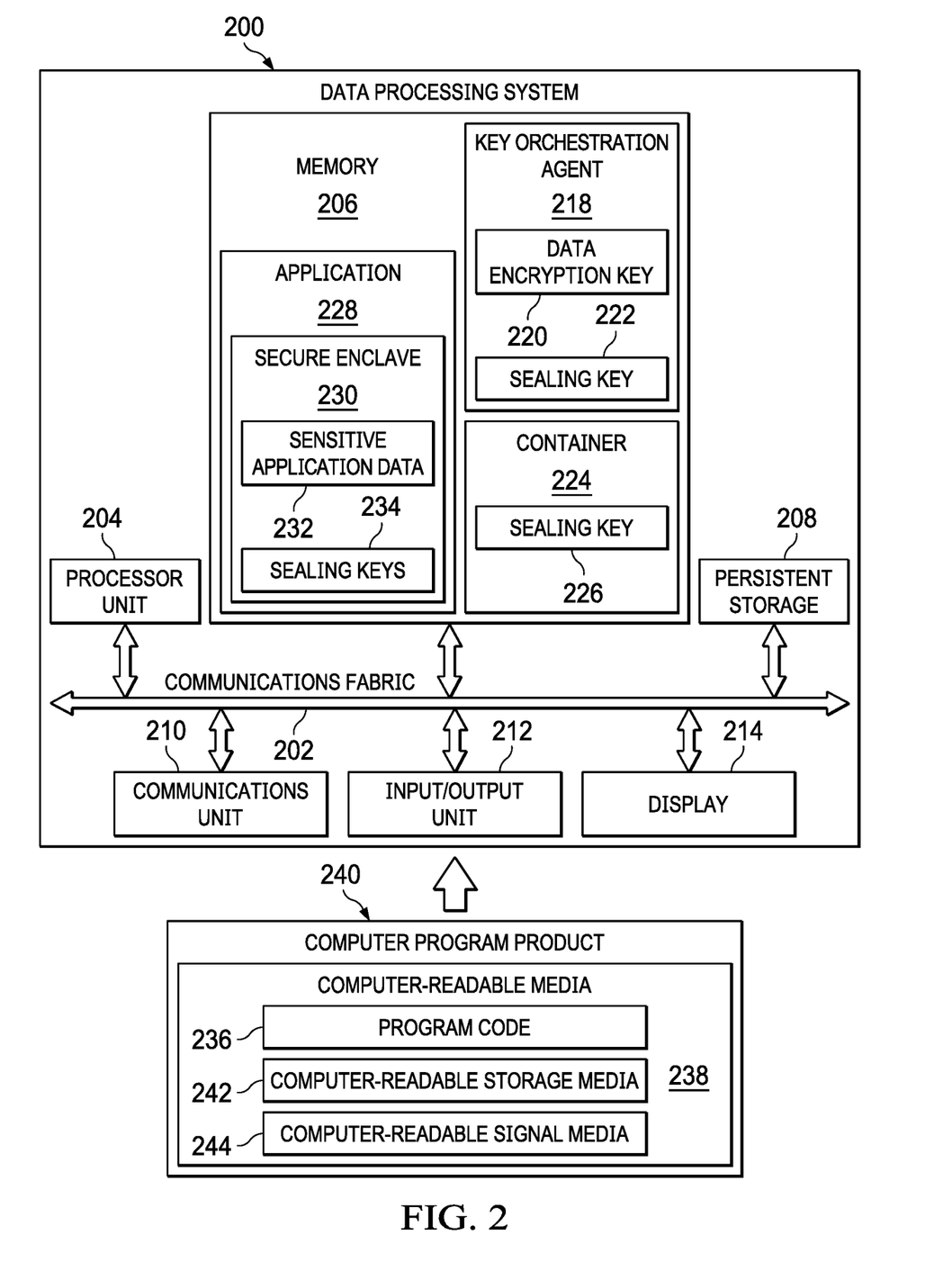
FIG. 2 is a diagram of a data processing system in which illustrative embodiments may be implemented.
Figure 3:
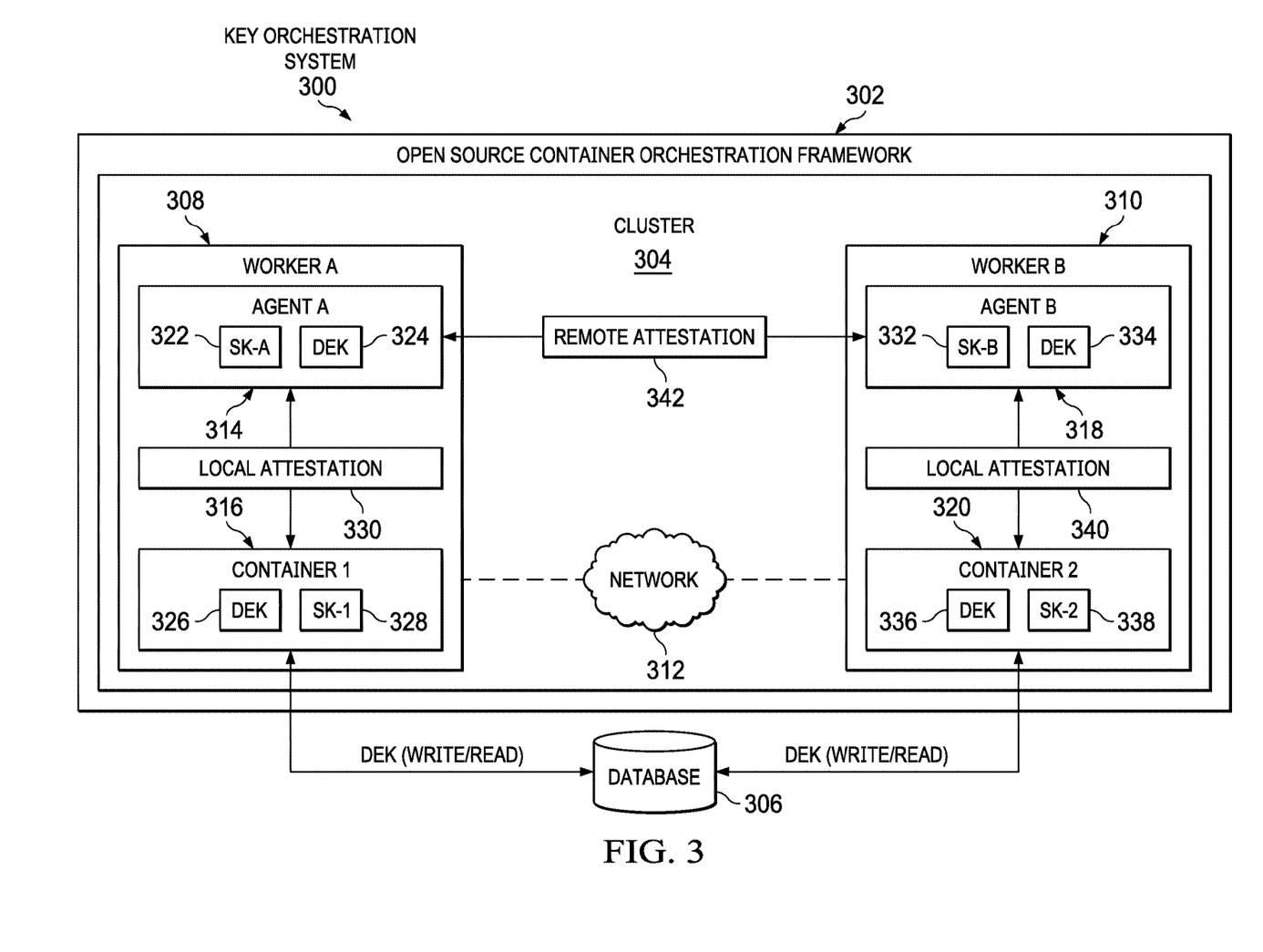
FIG. 3 is a diagram illustrating an example of a cryptographic key orchestration system in accordance with an illustrative embodiment.

With reference now to the figures, and in particular, with reference to FIGS. 1-3, diagrams of data processing environments are provided in which illustrative embodiments may be implemented. It should be appreciated that FIGS. 1-3 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, and fiber optic cables.

In the depicted example, server 104 and server 106 connect to network 102, along with storage 108. Server 104 and server 106 may be, for example, worker nodes within cluster 110 of open source container orchestration framework 112. Open source container orchestration framework 112 may be, for example, a Kubernetes managed container environment. Server 104 and server 106 may represent physical servers or virtual servers. In addition, server 104 and server 106 may have high-speed connections to network 102 and provide a set of services, such as, for example, event monitoring services, financial services, banking services, governmental services, educational services, reservation services, data services, and the like, to client devices using one or more distributed, multi-tier applications. Also, it should be noted that server 104 and server 106 may each represent clusters of computing nodes in one or more cloud environments. Alternatively, server 104 and server 106 may each represent clusters of servers in one or more data centers.

Client 114, client 116, and client 118 also connect to network 102. Clients 114, 116, and 118 are clients of server 104 and server 106. In this example, clients 114, 116, and 118 are shown as desktop or personal computers with wire communication links to network 102. However, it should be noted that clients 114, 116, and 118 are examples only and may represent other types of data processing systems, such as, for example, network computers, laptop computers, handheld computers, smart phones, smart watches, smart televisions, smart appliances, gaming devices, kiosks, and the like. Users of clients 114, 116, and 118 may utilize clients 114, 116, and 118 to access and utilize the services provided by server 104 and server 106.

Storage 108 is a network storage device capable of storing any type of data in a structured format or an unstructured format. In addition, storage 108 may represent a plurality of network storage devices. Further, storage 108 may store identifiers and network addresses for a plurality of servers, cryptographic keys, encrypted data, and the like. Furthermore, storage 108 may store other types of data, such as authentication or credential data that may include user names, passwords, and biometric data associated with system administrators and users, for example.

In addition, it should be noted that network data processing system 100 may include any number of additional servers, clients, storage devices, and other devices not shown. Program code located in network data processing system 100 may be stored on a computer readable storage medium and downloaded to a computer or other data processing device for use. For example, program code may be stored on a computer readable storage medium on server 104 and downloaded to client 114 over network 102 for use on client 114.

In the depicted example, network data processing system 100 may be implemented as a number of different types of communication networks, such as, for example, an internet, an intranet, a local area network (LAN), a wide area network (WAN), a telecommunications network, or any combination thereof. FIG. 1 is intended as an example only, and not as an architectural limitation for the different illustrative embodiments.

With reference now to FIG. 2, a diagram of a data processing system is depicted in accordance with an illustrative embodiment. Data processing system 200 is an example of a computer, such as server 104 and server 106 in FIG. 1, in which computer readable program code or instructions implementing processes of illustrative embodiments may be located. Data processing system 200 may be, for example, a worker node within a cluster of worker nodes of an open source container orchestration framework, such as Kubernetes. Data processing system 200 contains and controls a set of resources that are available for use by data processing system 200. In this illustrative example, data processing system 200 includes communications fabric 202, which provides communications between processor unit 204, memory 206, persistent storage 208, communications unit 210, input/output (I/O) unit 212, and display 214. However, it should be noted that data processing system 200 is intended as an example only and may contain more or fewer components than illustrated.

Processor unit 204 serves to execute instructions for software applications and programs that may be loaded into memory 206. Processor unit 204 may be a set of one or more hardware processor devices or may be a multi-core processor, depending on the particular implementation.

Memory 206 and persistent storage 208 are examples of storage devices. A computer readable storage device is any piece of hardware that is capable of storing information, such as, for example, without limitation, data, computer readable program code in functional form, and/or other suitable information either on a transient basis and/or a persistent basis. Further, a computer readable storage device excludes a propagation medium. Memory 206, in these examples, may be, for example, a random-access memory (RAM), or any other suitable volatile or non-volatile storage device. Persistent storage 208 may take various forms, depending on the particular implementation. For example, persistent storage 208 may contain one or more devices. For example, persistent storage 208 may be a hard disk drive, a solid-state drive, a flash memory, a rewritable optical disk, a rewritable magnetic tape, or some combination of the above. The media used by persistent storage 208 may be removable. For example, a removable hard drive may be used for persistent storage 208.

Key orchestration agent 218 controls the process of generating cryptographic keys, such as data encryption key 220, sealing key 222, and sealing key 226, for data processing system 200. Data encryption key 220 is a cryptographic key for encrypting and decrypting sensitive application data 232 of application 228. Sealing key 222 is unique to key orchestration agent 218 and sealing key 226 is unique to container 224. Each sealing key may be based on, for example, hardware, such as processor unit 204, of data processing system 200. Sealing keys 222 and 226 are key encryption keys. In other words, key orchestration agent 218 uses sealing key 222 to seal or encrypt data encryption key 220 for security and protection of data encryption key 220.

Key orchestration agent 218 also controls the process of coordinating distribution of data encryption key 220 with container 224 created within data processing system 200. Container 224 represents a set of one or more containers, such as pods, that run a set of one or more workloads corresponding to application 228. Key orchestration agent 218 performs a local attestation process to ensure that container 224 is an authenticated, trusted container before sharing data encryption key 220 with container 224. After receiving data encryption key 220, container 224 seals or encrypts data encryption key 220 with sealing key 226, which is unique to container 224. Container 224 utilizes data encryption key 220 to encrypt and decrypt sensitive application data 232 corresponding to application 228.

Key orchestration agent 218 further controls the process of coordinating distribution of data encryption key 220 with a set of one or more other data processing systems (i.e., set of other worker nodes within the cluster). Key orchestration agent 218 performs a remote attestation process to ensure that each worker node in the set of other worker nodes is an authenticated, trusted worker node before sharing data encryption key 220 with a respective worker node in the cluster.

Application 228 may represent a distributed, multi-tier application that runs on the set of containers, such as container 224, on data processing system 200. Application 228 may represent any type of software application, such as, for example, a banking application, a financial application, a medical application, an insurance application, a business application, an entertainment application, a gaming application, a streaming data application, and the like, which performs a service for requesting client devices.

Secure enclave 230 is an encrypted section of memory 206 where aspects of application 228's functionality are protected, keeping sensitive application data 232 confidential and unmodified. Sensitive application data 232 represents any type of private information, such as personal user information, medical records, bank balances, credit card numbers, social security numbers, financial records, or the like, corresponding to application 228. Secure enclave 230 also stores sealing keys 234. Sealing keys 234 represent sealing key 222 and sealing key 226. Key orchestration agent 218 and container 224 retrieve sealing key 222 and sealing key 226, respectively, when needed from secure enclave 230 to seal data encryption key 220.

As a result, data processing system 200 operates as a special purpose computer system in which key orchestration agent 218 in data processing system 200 enables cryptographic key orchestration with trusted containers within data processing system 200 and with other trusted worker nodes in the cluster, such as cluster 110 in FIG. 1. In particular, key orchestration agent 218 transforms data processing system 200 into a special purpose computer system as compared to currently available general purpose computer systems that do not have key orchestration agent 218.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra high frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, fifth-generation (5G), or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, a microphone, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in memory 206 and persistent storage 208, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer readable program code that may be read and run by a processor in processor unit 204. The program instructions, in the different embodiments, may be embodied on different physical computer readable storage devices, such as memory 206 or persistent storage 208.

Program code 236 is located in a functional form on computer readable media 238 that is selectively removable and may be loaded onto or transferred to data processing system 200 for running by processor unit 204. Program code 236 and computer readable media 238 form computer program product 240. In one example, computer readable media 238 may be computer readable storage media 242 or computer readable signal media 244. Computer readable storage media 242 may include, for example, an optical or magnetic disc that is inserted or placed into a drive or other device that is part of persistent storage 208 for transfer onto a storage device, such as a hard drive, that is part of persistent storage 208. Computer readable storage media 242 also may take the form of a persistent storage, such as a hard drive, a thumb drive, or a flash memory that is connected to data processing system 200. In some instances, computer readable storage media 242 may not be removable from data processing system 200.

Alternatively, program code 236 may be transferred to data processing system 200 using computer readable signal media 244. Computer readable signal media 244 may be, for example, a propagated data signal containing program code 236. For example, computer readable signal media 244 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 236 may be downloaded over a network to persistent storage 208 from another device or data processing system through computer readable signal media 244 for use within data processing system 200. For instance, program code stored in a computer readable storage media in a data processing system may be downloaded over a network from the data processing system to data processing system 200. The data processing system providing program code 236 may be a server computer, a client computer, or some other device capable of storing and transmitting program code 236.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 242 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Illustrative embodiments address the challenges of sharing sensitive application data in dynamic, distributed open source container orchestration frameworks using a cryptographic key orchestration process between trusted containers and worker nodes in infrastructures of the open source container orchestration frameworks. When having a cluster with "n" number of worker nodes in an open source container orchestration framework, illustrative embodiments enable every worker node in the cluster to access sensitive application data inside a secure enclave by encrypting and decrypting the sensitive application data using a data encryption key. Illustrative embodiments share the data encryption key among trusted (i.e., attested) worker nodes. Each worker node protects its data encryption key by encrypting the data encryption key with a sealing key, which is unique to a secure enclave on a given worker node. By utilizing this mechanism, illustrative embodiments tag security to hardware (i.e., the worker node's processor), while also providing a mechanism of key orchestration between trusted worker nodes.

Upon creation of a worker node in a cluster, the worker node generates a data encryption key for encrypting sensitive application data running in a secure enclave of the worker node. When the worker node is the only worker node in the cluster, a key orchestration software agent, such as, for example, a "key orchestration daemon" of a daemon set, which is located in the worker node, generates the data encryption key. A daemon set ensures that an instance of a specific container is running on all, or a selection of, worker nodes in a cluster. A daemon set creates containers on each added worker node and garbage collects containers when worker nodes are removed from the cluster. A daemon set may include other daemons, such as, for example, a cluster storage daemon, a log collector daemon, a monitoring daemon, and the like.

The worker node protects sensitive application data running in the secure enclave using the data encryption key. In addition, the worker node seals the data encryption key using its sealing key, which is derived from the processor of the worker node, making the sealing key unique to the worker node. It should be noted that the secure enclave can retrieve the sealing key only on a same worker node. In other words, the same secure enclave on a different worker node will have a different sealing key.

When a new worker node is created in the cluster, the software agent (e.g., key orchestration daemon) of the new worker node performs a remote attestation with the existing worker node in the cluster. Attestation is the process of demonstrating that a software executable has been properly instantiated on a platform. Attestation allows a remote party to gain confidence that the intended software is securely running within a secure enclave on an Intel® SGX enabled platform. Attestation conveys the following information in an assertion: 1) identities of software being attested; 2) details of unmeasured state (e.g. the mode software is running in); and 3) data which software associates with itself. Upon successful attestation, the new worker node receives a copy of the data encryption key from the existing worker node in the cluster. After receiving the data encryption key, the new worker node seals the data encryption key with its own unique sealing key. Illustrative embodiments may also utilize a shared database or data store, which contains data encryption keys and encrypted data. Only trusted (i.e., attested) worker nodes can access the shared database.

Thus, illustrative embodiments enable different containers running a distributed application on different worker nodes within a cluster to share sensitive application data between the different containers by using a data encryption key that is encrypted with a sealing key. Each container and each key orchestration agent has its own unique sealing key. Each key orchestration agent performs the attestation process. As a result, illustrative embodiments ensure that sensitive application data is only shared among trusted (i.e., attested) containers, even when containers move (e.g., are created, deleted, et cetera) within a cluster of worker nodes. Furthermore, illustrative embodiments can protect sensitive application data in any form of storage, such as, for example, on hard disk, in file storage, or the like.

Thus, illustrative embodiments provide one or more technical solutions that overcome a technical problem with sharing sensitive application data between containers within an open source container orchestration framework. As a result, these one or more technical solutions provide a technical effect and practical application in the field of data security.

With reference now to FIG. 3, a diagram illustrating an example of a cryptographic key orchestration system is depicted in accordance with an illustrative embodiment. Cryptographic key orchestration system 300 may be implemented in a network of data processing systems, such as network data processing system 100 in FIG. 1. Cryptographic key orchestration system 300 is a system of hardware and software components for providing cryptographic key orchestration between trusted containers and nodes within a multi-node cluster of an open source container orchestration framework.

In this example, cryptographic key orchestration system 300 includes open source container orchestration framework 302, cluster 304, and database 306. Open source container orchestration framework 302, cluster 304, and database 306 may be, for example, open source container orchestration framework 112, cluster 110, and storage 108 in FIG. 1. However, it should be noted that in an alternative illustrative embodiment, database 306 may be located remotely outside of open source container orchestration framework 302. In another alternative illustrative embodiment, database 306 is optional.

In this example, cluster 304 includes worker node A 308 and worker node B 310, such as, for example, server 104 and server 106 in FIG. 1. However, it should be noted that cluster 304 may contain any number of worker nodes. Worker node A 308 and worker node B 310 communicate with each other via network 312, such as network 102 in FIG. 1.

Worker node A 308 includes agent A 314 and container 1 316. Similarly, worker node B 310 includes agent B 318 and container 2 320. Agent A 314 and agent B 318 are similar to key orchestration agent 218 in FIG. 2. Also, container 1 316 and container 2 320 are similar to container 224 in FIG. 2.

Agent A 314 contains sealing key A (SK-A) 322 and data encryption key (DEK) 324. Sealing key A 322 and data encryption key 324 may be, for example, sealing key 222 and data encryption key 220 in FIG. 2. Sealing key A 322 is unique to agent A 314. Agent A 314 seals data encryption key 324 using sealing key A 322.

Container 1 316 contains data encryption key (DEK) 326 and sealing key 1 (SK-1) 328. Sealing key 1 328 is unique to container 1 316. Container 1 316 seals data encryption key 326 using sealing key 1 328. It should be noted that data encryption key 326 in container 1 316 is the same as data encryption key 324 in agent A 314. Agent A 314 shares a copy of data encryption key 324 with container 1 316 after determining that container 1 316 is a trusted container based on local attestation 330. Local attestation 330 provides assertions between secure enclaves running on worker node A 308. In other words, the secure enclaves on worker node A 308 use their reports to provide authentication to each other. For both local and remote attestation, the protected portions of the application are loaded into the secure enclave, which measures the application's code and data and then generates a report. After establishing authenticity, the secure enclaves exchange information via a secure channel.

Agent B 318 contains sealing key B (SK-B) 332. It should be noted that data encryption key 324 in agent A 314 is the same as data encryption key 334 in agent B 318. Agent A 314 shares a copy of data encryption key 324 with agent B 318 after determining that agent B 318 is a trusted key orchestration agent based on remote attestation 342. Remote attestation 342 provides assertions from agent A 314 to agent B 318. In remote attestation, the secure enclave on agent A 314 sends a quote to agent B 318. Agent B 318 then performs validation as to whether an authentic processor generated the quote. Upon validation, agent B 318 trusts authenticity of the secure enclave on agent A 314. After receiving data encryption key 334, agent B 318 seals data encryption key 334 using sealing key B 332, which is unique to agent B 318.

Container 2 320 contains data encryption key (DEK) 336 and sealing key 2 (SK-2) 338. Sealing key 2 338 is unique to container 2 320. Container 2 320 seals data encryption key 336 using sealing key 2 338. It should be noted that data encryption key 336 in container 2 320 is the same as data encryption key 334 in agent B 318. Agent B 318 shares a copy of data encryption key 334 with container 2 320 after determining that container 2 320 is a trusted container based on local attestation 340. Local attestation 340 is a similar local attestation process as local attestation 330.

Container 1 316 and container 2 320 utilize their respective data encryption keys to decrypt and encrypt sensitive application data corresponding to workloads associated with the distributed application running on container 1 316 and container 2 320. Open source container orchestration framework 302 utilizes database 306 to store, for example, encrypted data and cryptographic keys. Database 306 is a shared database.

Figure 4:
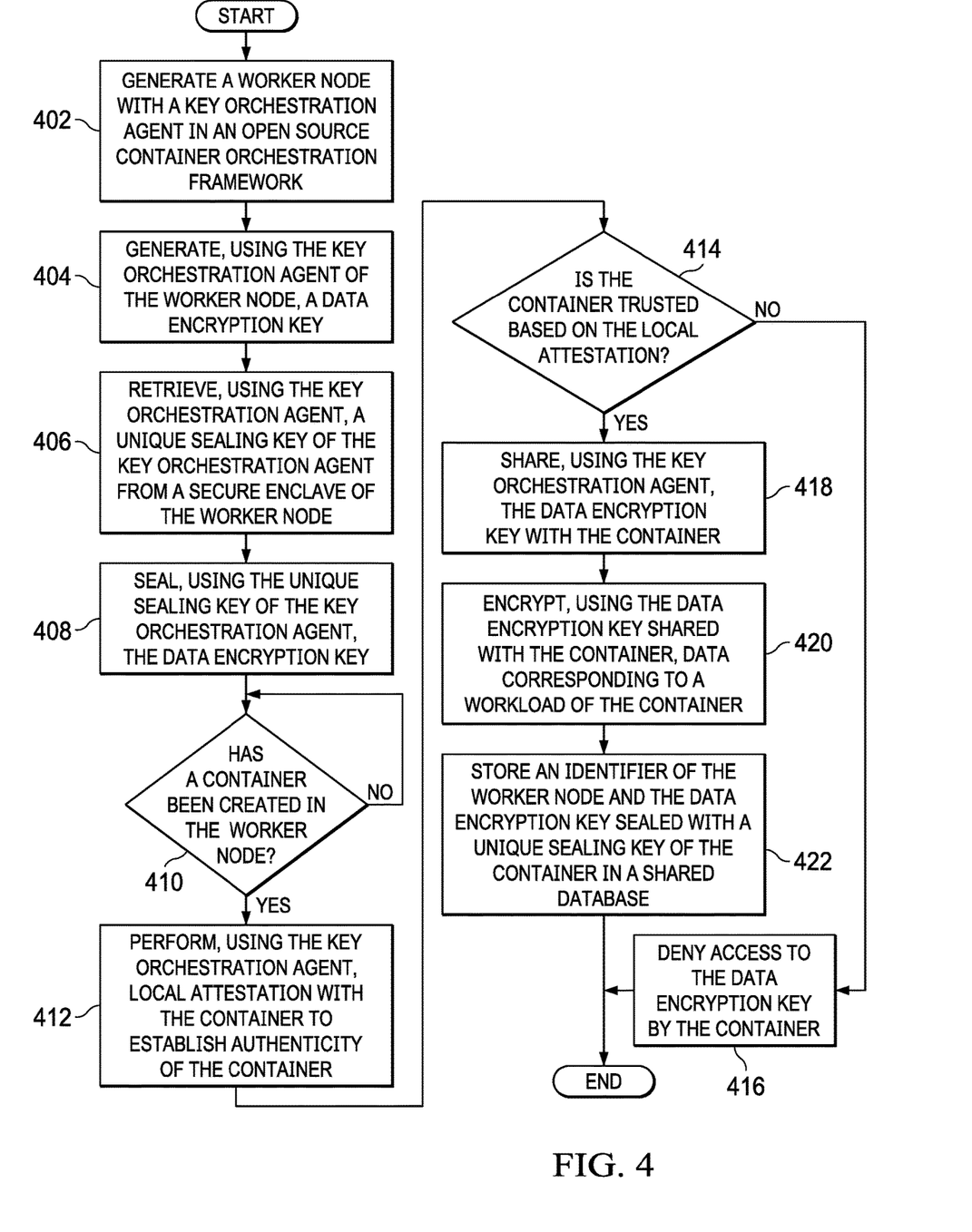
FIG. 4 is a flowchart illustrating a process for cryptographic key orchestration between a worker node and a container created on the worker node in accordance with an illustrative embodiment.

With reference now to FIG. 4, a flowchart illustrating a process for cryptographic key orchestration between a worker node and a container created on the worker node is shown in accordance with an illustrative embodiment. The process shown in FIG. 4 may be implemented in an open source container orchestration framework, such as, for example, open source container orchestration framework 112 in FIG. 1 or open source container orchestration framework 302 in FIG. 3.

The process begins when a set of one or more processors in the open source container orchestration framework generates a worker node with a key orchestration agent in the open source container orchestration framework (step 402). The set of one or more processors may be located in one or more nodes of the open source container orchestration framework. In addition, the set of processors, using the key orchestration agent of the worker node, generates a data encryption key (step 404). Further, the set of processors, using the key orchestration agent, retrieves a unique sealing key of the key orchestration agent from a secure enclave of the worker node (step 406). The set of processors, using the unique sealing key of the key orchestration agent, seals the data encryption key (step 408).

The set of processors makes a determination as to whether a container has been created in the worker node (step 410). If the set of processors determines that a container has not been created in the worker node, no output of step 410, then the process returns to step 410 where the set of processors waits for a container to be created in the worker node. If the set of processors determines that a container has been created in the worker node, yes output of step 410, then the set of processors, using the key orchestration agent, performs local attestation with the container to establish authenticity of the container (step 412).

The set of processors makes a determination as to whether the container is trusted based on the local attestation (step 414). If the set of processors determines that the container is untrusted based on the local attestation, no output of step 414, then the set of processors denies access to the data encryption key by the container (step 416). Thereafter, the process terminates.

If the set of processors determines that the container is trusted based on the local attestation, yes output of step 414, then the set of processors, using the key orchestration agent, shares the data encryption key with the container (step 418). Further, the set of processors, using the data encryption key shared with the container, encrypts data corresponding to a workload of the container (step 420). Furthermore, the set of processors stores an identifier of the worker node and the data encryption key sealed with a unique sealing key of the container in a shared database (step 422). Thereafter, the process terminates.

Figure 5A:
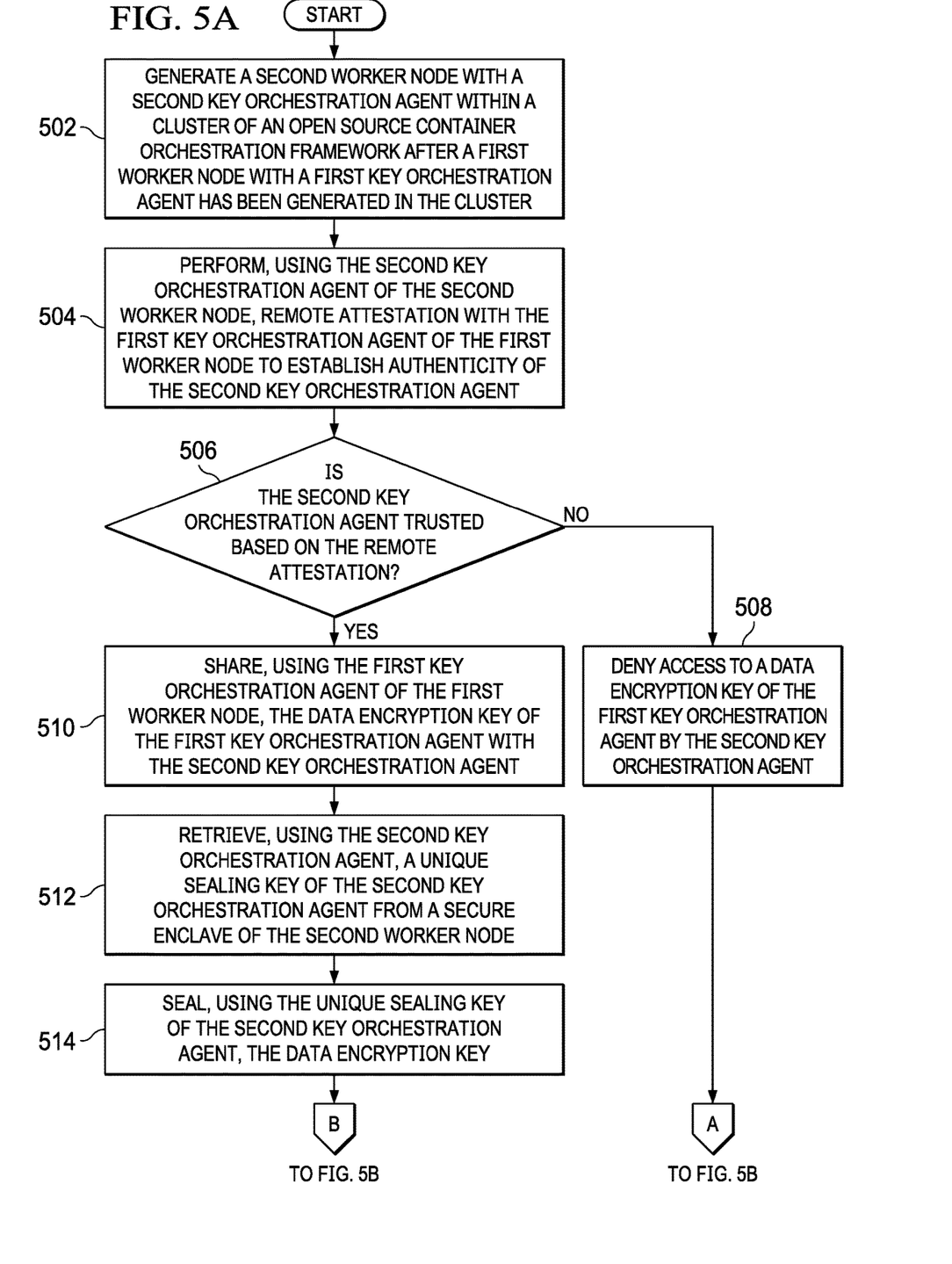
FIGS. 5A-5B are a flowchart illustrating a process for cryptographic key orchestration between an existing worker node and a newly generated worker node within a cluster in accordance with an illustrative embodiment.
Figure 5B:
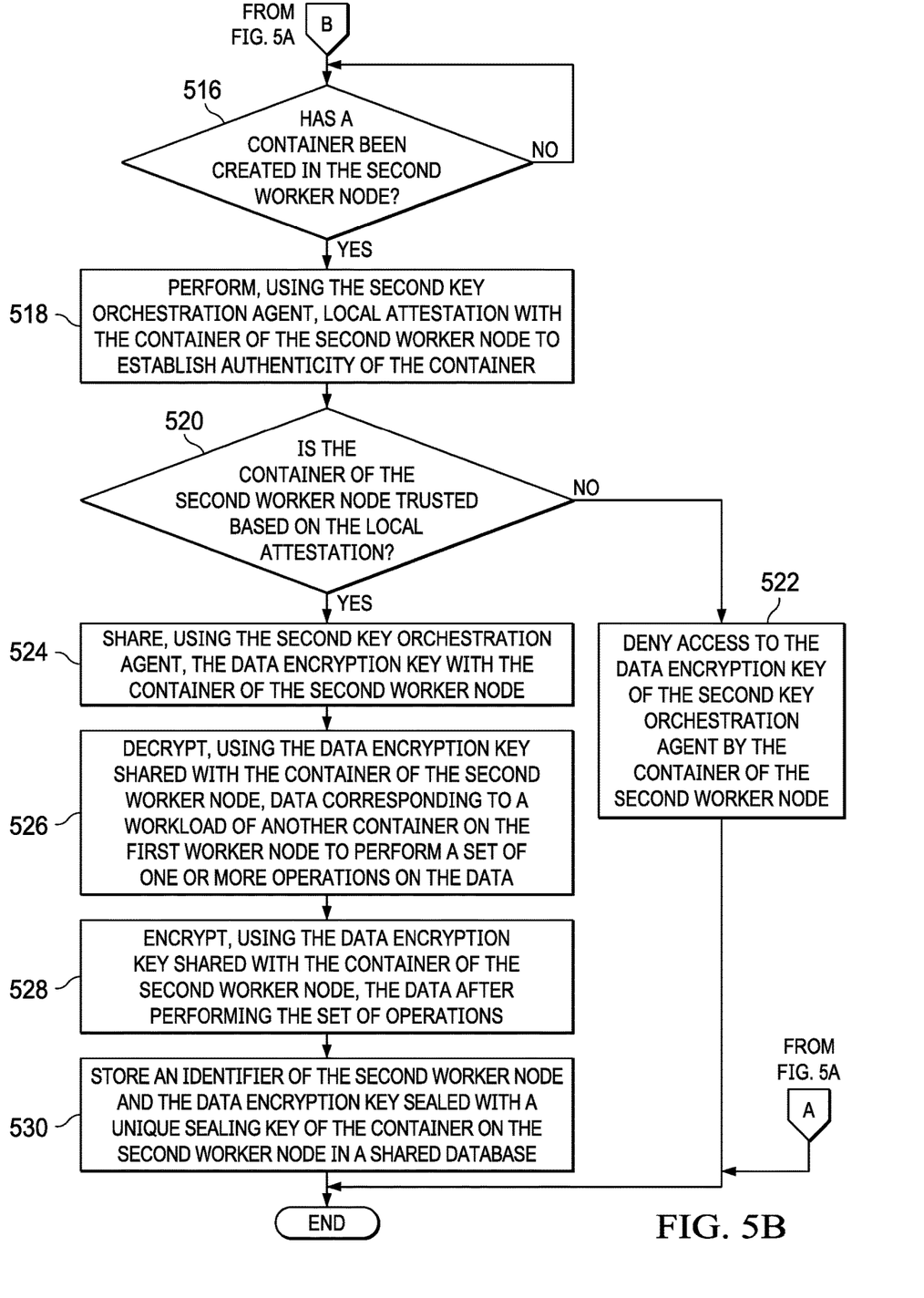

With reference now to FIGS. 5A-5B, a flowchart illustrating a process for cryptographic key orchestration between an existing worker node and a newly generated worker node within a cluster is shown in accordance with an illustrative embodiment. The process shown in FIGS. 5A-5B may be implemented in an open source container orchestration framework, such as, for example, open source container orchestration framework 112 in FIG. 1 or open source container orchestration framework 302 in FIG. 3.

The process begins when a set of one or more processors in the open source container orchestration framework generates a second worker node with a second key orchestration agent within a node cluster of the open source container orchestration framework after a first worker node with a first key orchestration agent has been generated in the cluster by the set of processors (step 502). The set of processors, using the second key orchestration agent of the second worker node, performs remote attestation with the first key orchestration agent of the first worker node to establish authenticity of the second key orchestration agent (step 504).

The set of processors makes a determination as to whether the second key orchestration agent is trusted based on the remote attestation (step 506). If the set of processors determines that the second key orchestration agent is untrusted based on the remote attestation, no output of step 506, then the set of processors denies access to a data encryption key of the first key orchestration agent by the second key orchestration agent (step 508). Thereafter, the process terminates.

If the set of processors determines that the second key orchestration agent is trusted based on the remote attestation, yes output of step 506, then the set of processors, using the first key orchestration agent of the first worker node, shares the data encryption key of the first key orchestration agent with the second key orchestration agent (step 510). Further, the set of processors, using the second key orchestration agent, retrieves a unique sealing key of the second key orchestration agent from a secure enclave of the second worker node (step 512). Furthermore, the set of processors, using the unique sealing key of the second key orchestration agent, seals the data encryption key (step 514).

The set of processors makes a determination as to whether a container has been created in the second worker node (step 516). If the set of processors determines that a container has not been created in the second worker node, no output of step 516, then the process returns to step 516 where the set of processors wait for a container to be created in the second worker node. If the set of processors determines that a container has been created in the second worker node, yes output of step 516, then the set of processors, using the second key orchestration agent, performs local attestation with the container of the second worker node to establish authenticity of the container (step 518).

The set of processors makes a determination as to whether the container of the second worker node is trusted based on the local attestation (step 520). If the set of processors determines that the container of the second worker node is untrusted based on the local attestation, no output of step 520, then the set of processors denies access to the data encryption key of the second key orchestration agent by the container of the second worker node (step 522). Thereafter, the process terminates.

If the set of processors determines that the container of the second worker node is trusted based on the local attestation, yes output of step 520, then the set of processors, using the second key orchestration agent, shares the data encryption key with the container of the second worker node (step 524). In addition, the set of processors, using the data encryption key shared with the container of the second worker node, decrypts data corresponding to a workload of another container on the first worker node in order to perform a set of one or more operations on the data (step 526). The set of operations may include, for example, one or more of create, read, update, and delete operations. Subsequently, the set of processors, using the data encryption key shared with the container of the second worker node, encrypts the data after performing the set of operations (step 528). Further, the set of processors stores an identifier of the second worker node and the data encryption key sealed with a unique sealing key of the container on the second worker node in a shared database (step 530). Thereafter, the process terminates.

Figure 6:
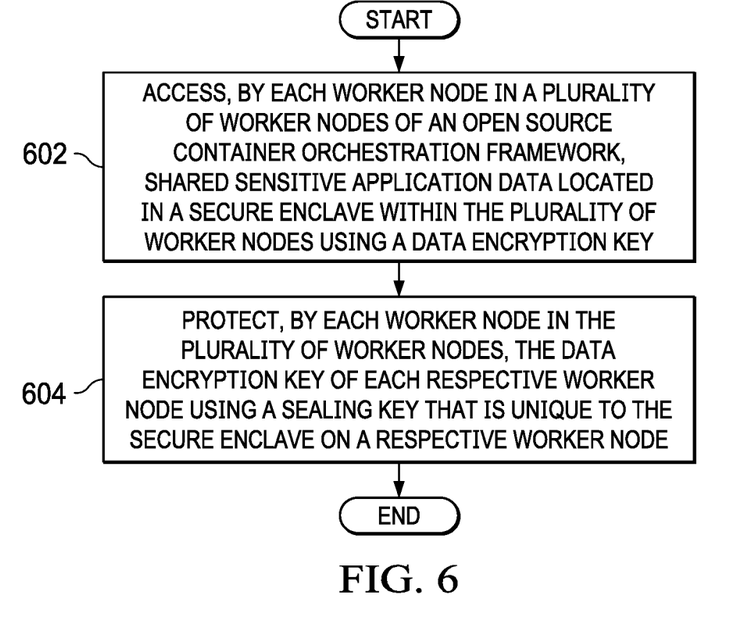
FIG. 6 is a flowchart illustrating a process for protecting data encryption keys of worker nodes in accordance with an illustrative embodiment.

With reference now to FIG. 6, a flowchart illustrating a process for protecting data encryption keys of worker nodes is shown in accordance with an illustrative embodiment. The process shown in FIG. 6 may be implemented in an open source container orchestration framework, such as, for example, open source container orchestration framework 112 in FIG. 1 or open source container orchestration framework 302 in FIG. 3.

The process begins when each worker node in a plurality of worker nodes of the open source container orchestration framework accesses shared sensitive application data located in a secure enclave within the plurality of worker nodes using a data encryption key (step 602). In addition, each worker node in the plurality of worker nodes protects the data encryption key of each respective worker node using a sealing key that is unique to the secure enclave on a respective worker node (step 604). Thereafter, the process terminates.

Figure 7:
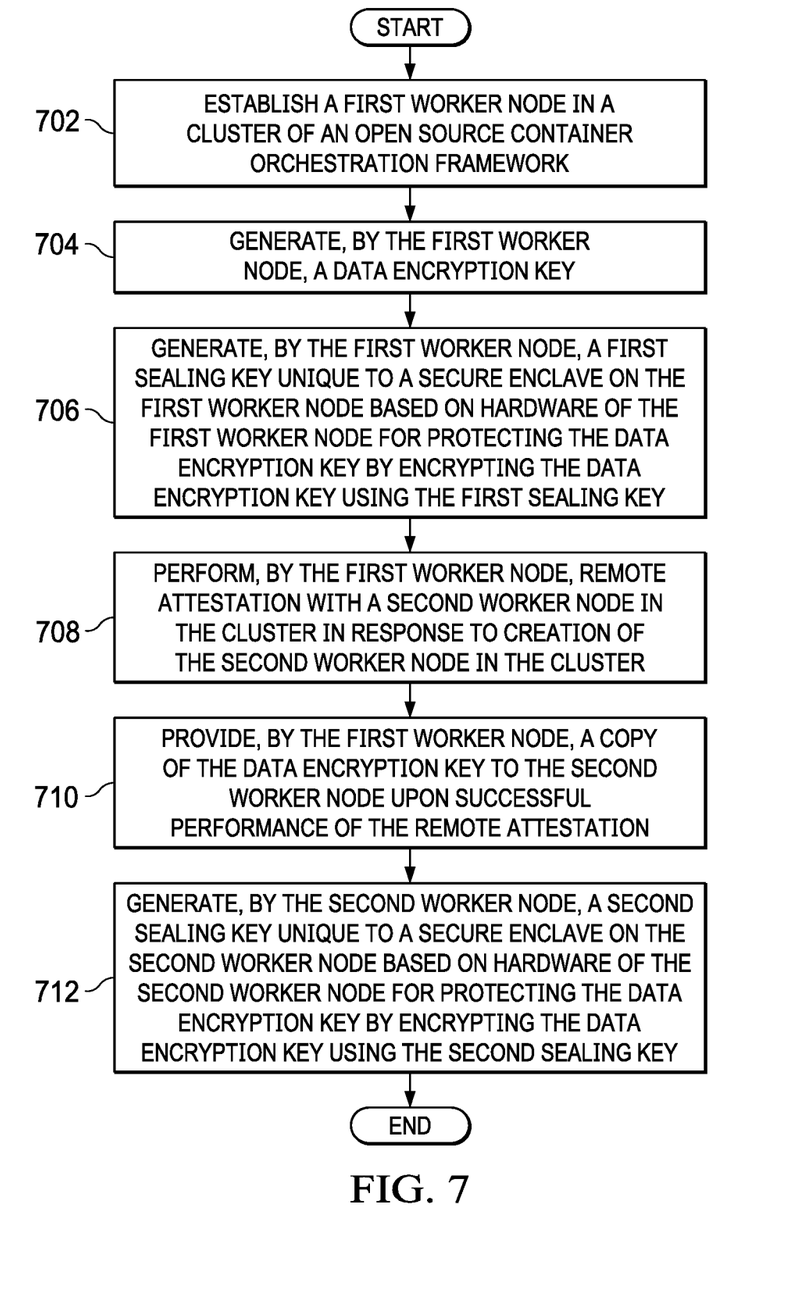
FIG. 7 is a flowchart illustrating a process for sharing a data encryption key between worker nodes in a cluster in accordance with an illustrative embodiment.

With reference now to FIG. 7, a flowchart illustrating a process for sharing a data encryption key between worker nodes in a cluster is shown in accordance with an illustrative embodiment. The process shown in FIG. 7 may be implemented in an open source container orchestration framework, such as, for example, open source container orchestration framework 112 in FIG. 1 or open source container orchestration framework 302 in FIG. 3.

The process begins when the open source container orchestration framework establishes a first worker node in the cluster of the open source container orchestration framework (step 702). The first worker node generates a data encryption key (step 704). In addition, the first worker node generates a first sealing key unique to a secure enclave on the first worker node based on hardware of the first worker node for protecting the data encryption key by encrypting the data encryption key using the first sealing key (step 706).

Subsequently, the first worker node performs remote attestation with a second worker node in the cluster in response to creation of the second worker node in the cluster (step 708). The first worker node provides a copy of the data encryption key to the second worker node upon successful performance of the remote attestation (step 710). The second worker node generates a second sealing key unique to a secure enclave on the second worker node based on hardware of the second worker node for protecting the data encryption key by encrypting the data encryption key using the second sealing key (step 712). Thereafter, the process terminates.

Thus, illustrative embodiments of the present invention provide a computer-implemented method, computer system, and computer program product for providing cryptographic key orchestration between trusted nodes and containers within a multi-node cluster of an open source container orchestration framework. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for accessing shared sensitive information in a managed container environment, the method comprising:
accessing, by each worker node in a plurality of worker nodes, shared sensitive application data located in a secure enclave within the plurality of worker nodes using a data encryption key;
protecting, by each worker node in the plurality of worker nodes, the data encryption key of each respective worker node using a sealing key that is unique to the secure enclave on a respective worker node;
establishing a first worker node in a cluster;
generating, by the first worker node, the data encryption key;
generating, by the first worker node, a first sealing key unique to the secure enclave on the first worker node for protecting the data encryption key;
performing, by the first worker node, remote attestation with a second worker node in the cluster in response to creation of the second worker node in the cluster; and
providing, by the first worker node, a copy of the data encryption key to the second worker node upon successful performance of the remote attestation.

2. The method of claim 1 further comprising:
generating, by the second worker node, a second sealing key unique to the secure enclave on the second worker node for protecting the data encryption key by encrypting the data encryption key using the second sealing key.

3. A system for accessing shared sensitive information in a managed container environment, the system comprising:
a plurality of worker nodes, wherein:
each worker node in the plurality of worker nodes accesses shared sensitive application data located in a secure enclave within the plurality of worker nodes using a data encryption key;
each worker node in the plurality of worker nodes protects the data encryption key of each respective worker node using a sealing key that is unique to the secure enclave on a respective worker node;
a first worker node is established in a cluster;
the first worker node generates the data encryption key;
the first worker node generates a first sealing key unique to the secure enclave on the first worker node for protecting the data encryption key;
the first worker node performs remote attestation with a second worker node in the cluster in response to creation of the second worker node in the cluster; and
the first worker node provides a copy of the data encryption key to the second worker node upon successful performance of the remote attestation.

4. The system of claim 3, wherein:
the second worker node generates a second sealing key unique to the secure enclave on the second worker node for protecting the data encryption key by encrypting the data encryption key using the second sealing key.

5. A computer program product for accessing shared sensitive information in a managed container environment, the computer program product comprising a computer readable storage medium having program instructions embodied therewith, the program instructions executable by a set of processors to cause the set of processors to perform a method comprising:
accessing, by each worker node in a plurality of worker nodes, shared sensitive application data located in a secure enclave within the plurality of worker nodes using a data encryption key;
protecting, by each worker node in the plurality of worker nodes, the data encryption key of each respective worker node using a sealing key that is unique to the secure enclave on a respective worker node;
establishing a first worker node in a cluster;
generating, by the first worker node, the data encryption key;
generating, by the first worker node, a first sealing key unique to the secure enclave on the first worker node for protecting the data encryption key;
performing, by the first worker node, remote attestation with a second worker node in the cluster in response to creation of the second worker node in the cluster; and
providing, by the first worker node, a copy of the data encryption key to the second worker node upon successful performance of the remote attestation.

6. The computer program product of claim 5 further comprising:
generating, by the second worker node, a second sealing key unique to the secure enclave on the second worker node for protecting the data encryption key by encrypting the data encryption key using the second sealing key.

7. A computer-implemented method for cryptographic key orchestration, the computer-implemented method comprising:
generating, by a set of processors, a first worker node with a first key orchestration agent in a cluster of an open source container orchestration framework;
generating, by the set of processors, using the first key orchestration agent of the first worker node, a data encryption key;
retrieving, by the set of processors, using the first key orchestration agent, a sealing key of the first key orchestration agent from a secure enclave of the first worker node; and
sealing, by the set of processors, using the sealing key of the first key orchestration agent, the data encryption key.

8. The computer-implemented method of claim 7 further comprising:
determining, by the set of processors, whether a container has been created in the first worker node; and
responsive to the set of processors determining that a container has been created in the first worker node, performing, by the set of processors, using the first key orchestration agent, local attestation with the container to establish authenticity of the container.

9. The computer-implemented method of claim 8 further comprising:
determining, by the set of processors, whether the container is trusted based on the local attestation; and
responsive to the set of processors determining that the container is untrusted based on the local attestation, denying, by the set of processors, access to the data encryption key by the container.

10. The computer-implemented method of claim 9 further comprising:
responsive to the set of processors determining that the container is trusted based on the local attestation, sharing, by the set of processors, using the first key orchestration agent, the data encryption key with the container;
encrypting, by the set of processors, using the data encryption key shared with the container, data corresponding to a workload of the container; and
storing, by the set of processors, an identifier of the first worker node and the data encryption key sealed with a unique sealing key of the container in a shared database.

11. The computer-implemented method of claim 7 further comprising:
generating, by the set of processors, a second worker node with a second key orchestration agent within the cluster; and
performing, by the set of processors, using the second key orchestration agent of the second worker node, remote attestation with the first key orchestration agent of the first worker node to establish authenticity of the second key orchestration agent.

12. The computer-implemented method of claim 11 further comprising:

determining, by the set of processors, whether the second key orchestration agent is trusted based on the remote attestation; and
responsive to the set of processors determining that the second key orchestration agent is untrusted based on the remote attestation, denying, by the set of processors, access to the data encryption key of the first key orchestration agent by the second key orchestration agent.

13. The computer-implemented method of claim 12 further comprising:
responsive to the set of processors determining that the second key orchestration agent is trusted based on the remote attestation, sharing, by the set of processors, using the first key orchestration agent of the first worker node, the data encryption key of the first key orchestration agent with the second key orchestration agent;
retrieving, by the set of processors, using the second key orchestration agent, a unique sealing key of the second key orchestration agent from a secure enclave of the second worker node; and
sealing, by the set of processors, using the unique sealing key of the second key orchestration agent, the data encryption key.

14. The computer-implemented method of claim 7, wherein sensitive application data is only shared among trusted containers, even when containers move within the cluster.

15. The computer-implemented method of claim 14, wherein the sensitive application data is protected in any form of storage.

16. A computer program product for cryptographic key orchestration, the computer program product comprising a computer readable storage medium having program instructions embodied therewith, the program instructions executable by a set of processors to cause the set of processors to perform a method comprising:
generating, by the set of processors, a first worker node with a first key orchestration agent in a cluster of an open source container orchestration framework;
generating, by the set of processors, using the first key orchestration agent of the first worker node, a data encryption key;
retrieving, by the set of processors, using the first key orchestration agent, a sealing key of the first key orchestration agent from a secure enclave of the first worker node; and
sealing, by the set of processors, using the sealing key of the first key orchestration agent, the data encryption key.

17. The computer program product of claim 16 further comprising:
determining, by the set of processors, whether a container has been created in the first worker node; and
responsive to the set of processors determining that a container has been created in the first worker node, performing, by the set of processors, using the first key orchestration agent, local attestation with the container to establish authenticity of the container.

18. The computer program product of claim 17 further comprising:
determining, by the set of processors, whether the container is trusted based on the local attestation; and
responsive to the set of processors determining that the container is untrusted based on the local attestation, denying, by the set of processors, access to the data encryption key by the container.

19. The computer program product of claim 18 further comprising:
responsive to the set of processors determining that the container is trusted based on the local attestation, sharing, by the set of processors, using the first key orchestration agent, the data encryption key with the container;
encrypting, by the set of processors, using the data encryption key shared with the container, data corresponding to a workload of the container; and
storing, by the set of processors, an identifier of the first worker node and the data encryption key sealed with a unique sealing key of the container in a shared database.

20. The computer program product of claim 16 further comprising:
generating, by the set of processors, a second worker node with a second key orchestration agent within the cluster; and
performing, by the set of processors, using the second key orchestration agent of the second worker node, remote attestation with the first key orchestration agent of the first worker node to establish authenticity of the second key orchestration agent.

21. The computer program product of claim 20 further comprising:
determining, by the set of processors, whether the second key orchestration agent is trusted based on the remote attestation; and
responsive to the set of processors determining that the second key orchestration agent is untrusted based on the remote attestation, denying, by the set of processors, access to the data encryption key of the first key orchestration agent by the second key orchestration agent.

22. The computer program product of claim 21 further comprising
responsive to the set of processors determining that the second key orchestration agent is trusted based on the remote attestation, sharing, by the set of processors, using the first key orchestration agent of the first worker node, the data encryption key of the first key orchestration agent with the second key orchestration agent;
retrieving, by the set of processors, using the second key orchestration agent, a unique sealing key of the second key orchestration agent from a secure enclave of the second worker node; and
sealing, by the set of processors, using the unique sealing key of the second key orchestration agent, the data encryption key.

* * * * *